L. M. Reed,
Plow Share.

No. 85,533.  Patented Jan. 5, 1869.

Witnesses:
J. H. Burridge
Frank S. Alden

Inventor:
L. M. Reed

L. M. REED, OF TROY, OHIO.

Letters Patent No. 85,533, dated January 5, 1869.

IMPROVEMENT IN PLOWSHARES.

The Schedule referred to in these Letters Patent and making part of the same.

*To all whom it may concern:*

Be it known that I, L. M. REED, of Troy, in the county of Geauga, State of Ohio, have invented certain new and useful Improvements in Plowshares; and I do hereby declare that the following is a full and complete description of the same, reference being had to the accompanying drawings, making a part of this specification, in which—

Like letters of reference refer to like parts in the several views.

The nature of this invention relates to a plowshare, the wings of which are the coulter, being provided with a series of chisel-shaped teeth, whereby heavy turf, roots, and other obstructions, are cut, thereby rendering the draught of the plow much lighter for the team.

Figure 1:
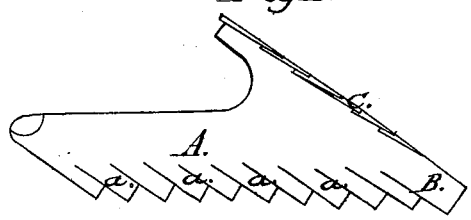
Figure 1 is a top view.

Fig. 1 represents a plowshare, of which—

A is the wing;

B, the point; and

C, the coulter.

It will be observed that the edge of the wing is armed with a series of chisel-shaped teeth or cutters, *a*, projecting forward in parallel lines with the point, the edges of the cutters being in the same direction with the edge of the point. Hence, the grade or inclination of each tooth or cutter is upward, and in the same direction as the extreme point B.

Figure 2:
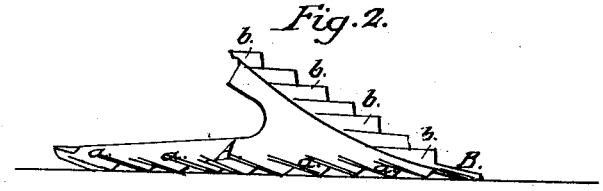
Figures 2 and 3 are side views of the shares.

It will also be seen that the coulter is armed with a series of teeth, *b*, of the same shape, the grade running parallel to each other, and to the edge of the wing, whereas the cutting-edge of each is in a vertical line, as shown in fig. 2.

The practical advantages of a plow provided with shares of this description are, that in plowing in tough sod, or heavy, hard soils, it will run much easier than one having only a plain, even cutting-edge, as there is a larger cutting-surface presented to the work than is presented in the ordinary straight share. Hence, there is less tearing apart of the sod, but it is cut easily and smoothly, so that the furrow will turn without breaking.

Also, in plowing in new ground, this share is not liable to be thrown out by the roots of the stumps, but will cut its way through them, either directly, by the edge of one of the teeth, or by the action of several, sawing their way through.

The share is also less disturbed by stones, but will push them out of the way with greater facility than will the ordinary share.

Figure 3:

The share may be used without teeth on the coulter, as shown in fig. 3.

What I claim as my invention, and desire to secure by Letters Patent, is—

A plowshare, provided with cutters, constructed and arranged substantially as and for the purpose set forth.

L. M. REED.

Witnesses:
 J. H. BURRIDGE,
 FRANK S. ALDEN.